(12) United States Patent
Schorle et al.

(10) Patent No.: US 8,454,050 B2
(45) Date of Patent: Jun. 4, 2013

(54) AIRBAG HOUSING

(75) Inventors: Michael A. Schorle, White Lake, MI (US); Peter L. Vigeant, Whitmore Lake, MI (US); Bryan H. Stover, Brighton, MI (US)

(73) Assignee: Toyoda Gosei Co. Ltd., Aichi (JP)

( * ) Notice: Subject to any disclaimer, the term of this patent is extended or adjusted under 35 U.S.C. 154(b) by 97 days.

(21) Appl. No.: 13/045,871

(22) Filed: Mar. 11, 2011

(65) Prior Publication Data

US 2011/0227318 A1    Sep. 22, 2011

Related U.S. Application Data

(60) Provisional application No. 61/315,474, filed on Mar. 19, 2010.

(51) Int. Cl.
*B60R 21/16*    (2006.01)

(52) U.S. Cl.
USPC .................................................. 280/728.2

(58) Field of Classification Search
USPC ................................ 280/728.2, 728.3, 732
See application file for complete search history.

(56) References Cited

U.S. PATENT DOCUMENTS

| 5,511,819 | A  | * | 4/1996 | Spilker et al. | 280/728.2 |
|---|---|---|---|---|---|
| 5,788,267 | A  | * | 8/1998 | Lotspih et al. | 280/728.2 |
| 5,944,340 | A  | * | 8/1999 | Bohn et al. | 280/728.2 |
| 7,073,817 | B2 | * | 7/2006 | Rogers et al. | 280/728.2 |
| 7,097,196 | B2 | * | 8/2006 | Chavez et al. | 280/728.2 |
| 7,168,730 | B2 | * | 1/2007 | Seo | 280/728.2 |
| 7,325,823 | B2 | * | 2/2008 | Dannenhauer et al. | 280/728.2 |
| 7,374,198 | B2 | * | 5/2008 | Tata et al. | 280/728.2 |

* cited by examiner

*Primary Examiner* — Faye M. Fleming
(74) *Attorney, Agent, or Firm* — Carlson, Gaskey & Olds PC

(57) ABSTRACT

An example airbag housing assembly includes a base and an end cap. The end cap is positioned at a lateral end of the base. The end cap is configured to be fastened directly to a vehicle.

18 Claims, 20 Drawing Sheets

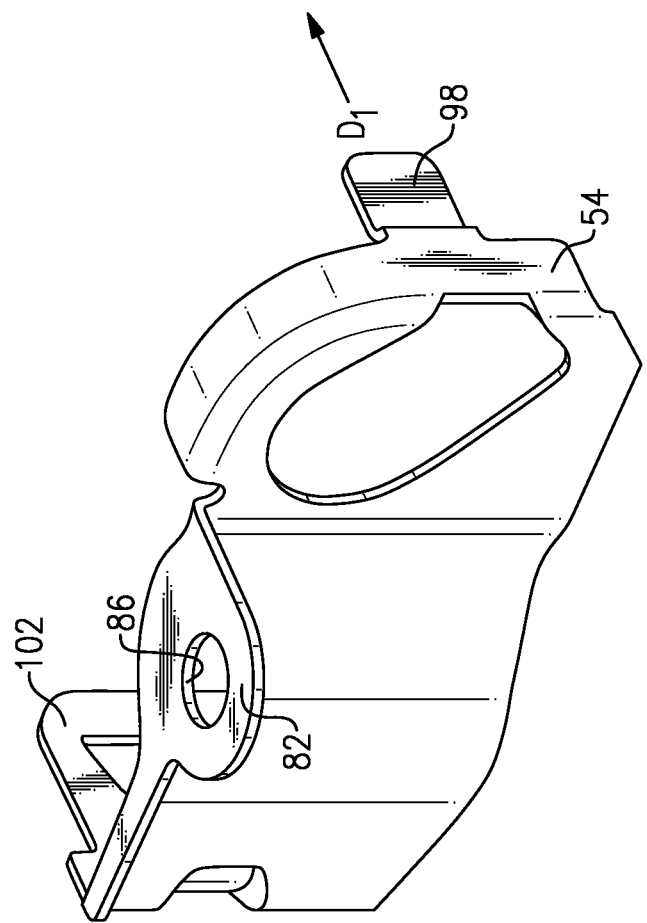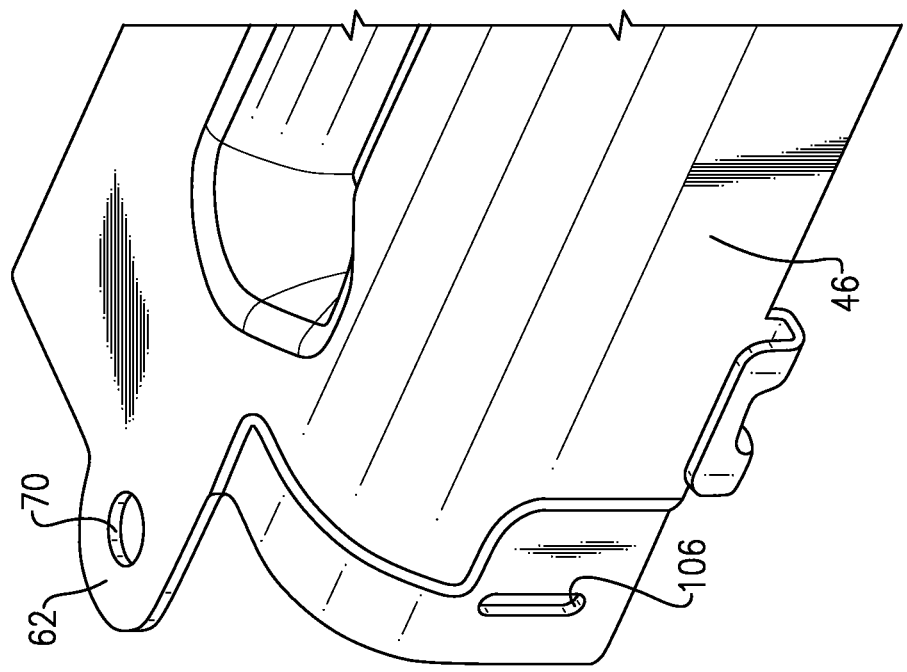
FIG.8

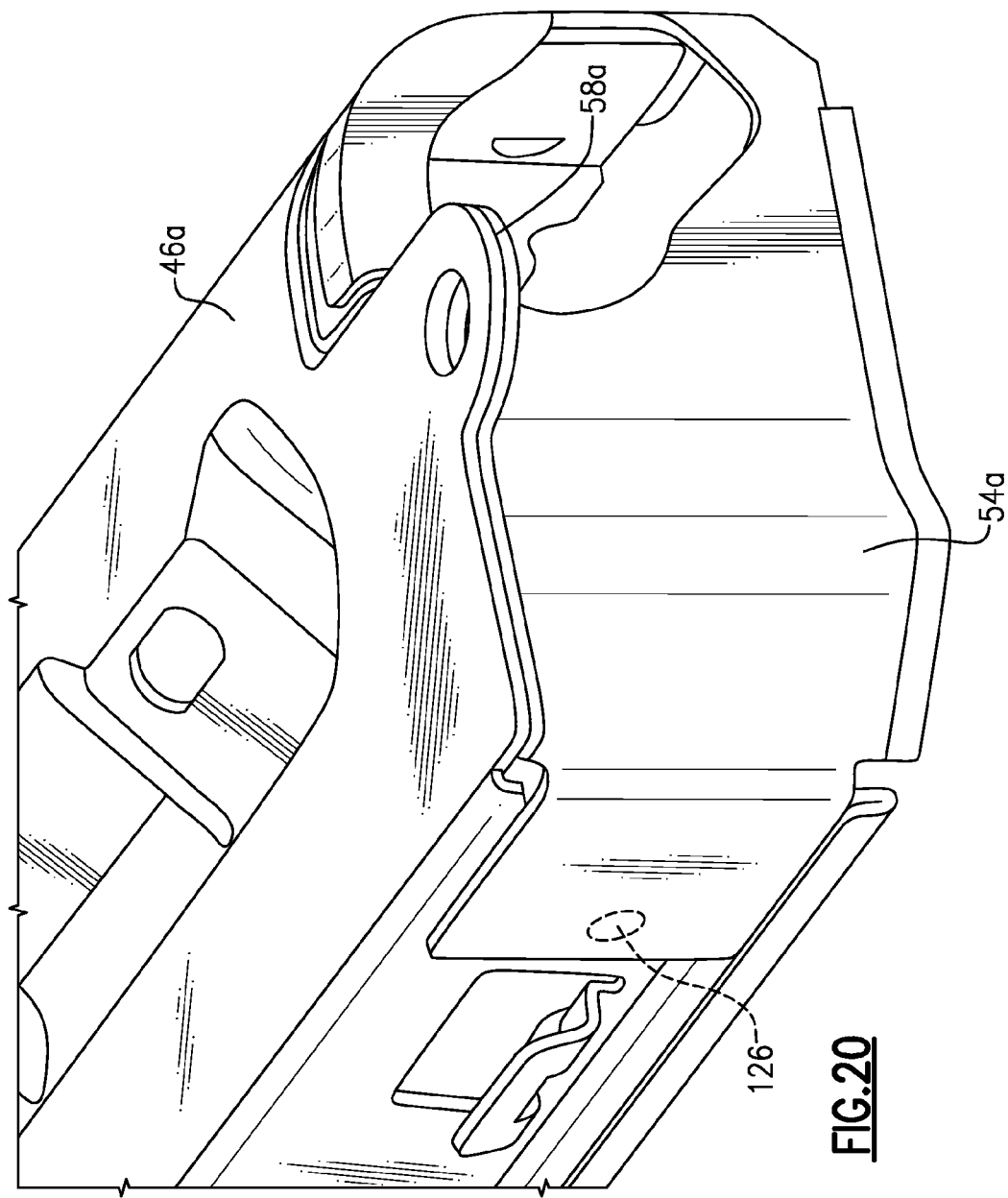

AIRBAG HOUSING

CROSS-REFERENCE TO RELATED APPLICATIONS

This disclosure claims priority to U.S. Provisional Application No. 61/315,474, which was filed on 19 Mar. 2010 and is incorporated herein by reference.

BACKGROUND

This disclosure relates generally to an airbag housing assembly. More particularly, this disclosure relates to securing portions of an airbag housing assembly.

Airbag housing assemblies typically establish a cavity. An airbag and an inflator are positioned within the cavity and covered by a lid. The housing assembly protects the airbag and directs the airbag during deployment. The airbag expands through the lid when deployed. As known, the airbag generates considerable forces when deployed. The forces can cause the airbag housing to flex, which can disrupt the integrity of the airbag housing.

SUMMARY

An example airbag housing assembly includes a base and an end cap. The end cap is positioned at a lateral end of the base. The end cap is configured to be fastened directly to a vehicle.

An example airbag housing assembly includes a base and an end cap. The end cap is securable to an end of the base. The base and the end cap each include a portion that is configured to be held relative to a vehicle by a fastener to secure the base and the end cap relative to the vehicle.

An example method for assembling an airbag housing including securing an end cap to a base. The method fastens the end cap and the base to a vehicle. The method also includes capturing a portion of the end cap between a fastener and a portion of the vehicle during the fastening, and capturing a portion of the base between the fastener and a portion of the vehicle during the fastening.

BRIEF DESCRIPTION OF THE DRAWINGS

The various features and advantages of the disclosed examples will become apparent to those skilled in the art from the detailed description. The figures that accompany the detailed description can be briefly described as follows:

FIG. 8 shows an exploded view of an end of the housing in the FIG. 1 airbag housing assembly.

FIG. 20 shows another end view of the FIG. 16 housing.

DETAILED DESCRIPTION

Figure 1:
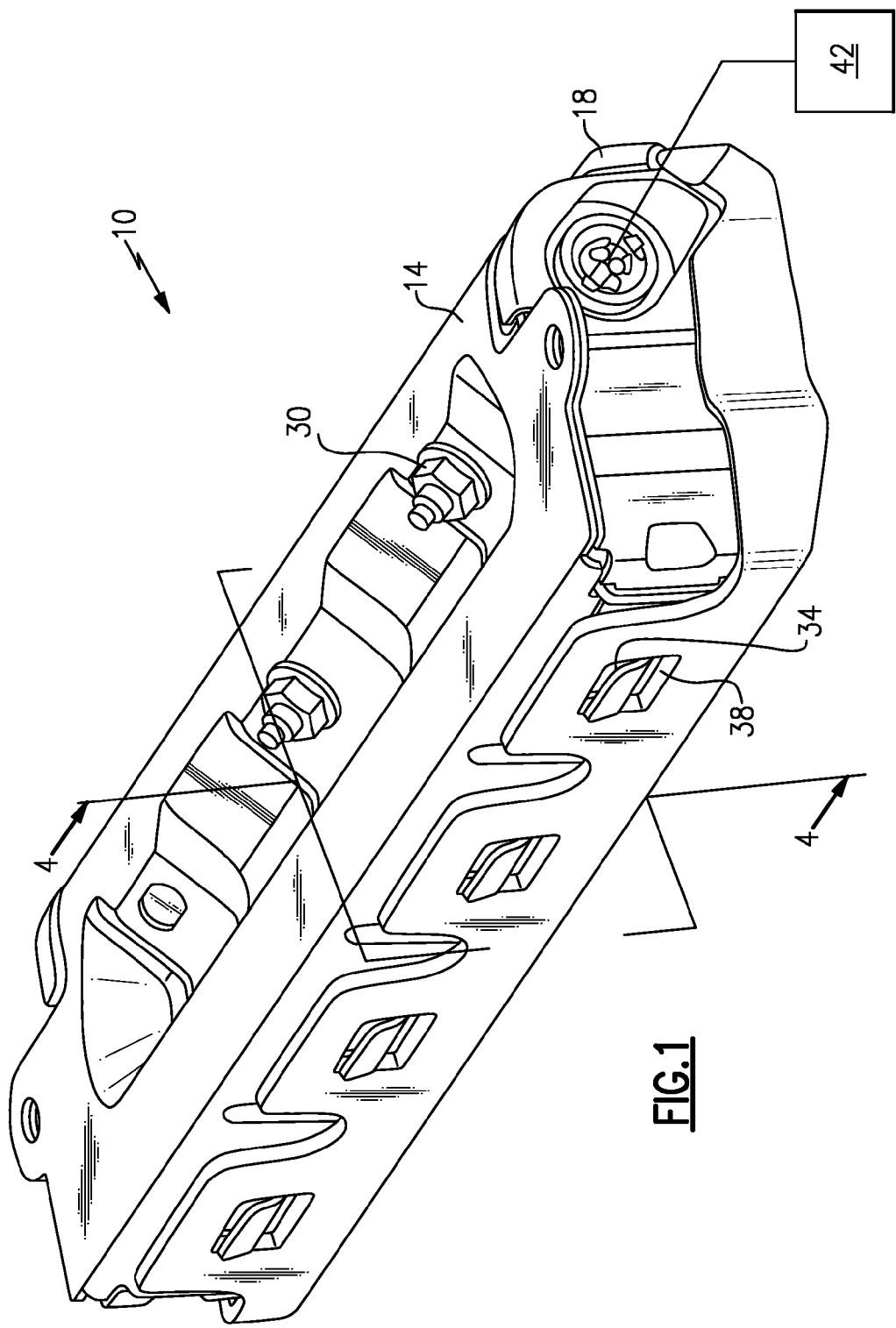
FIG. 1 shows a perspective view of an example airbag housing assembly.
Figure 2:
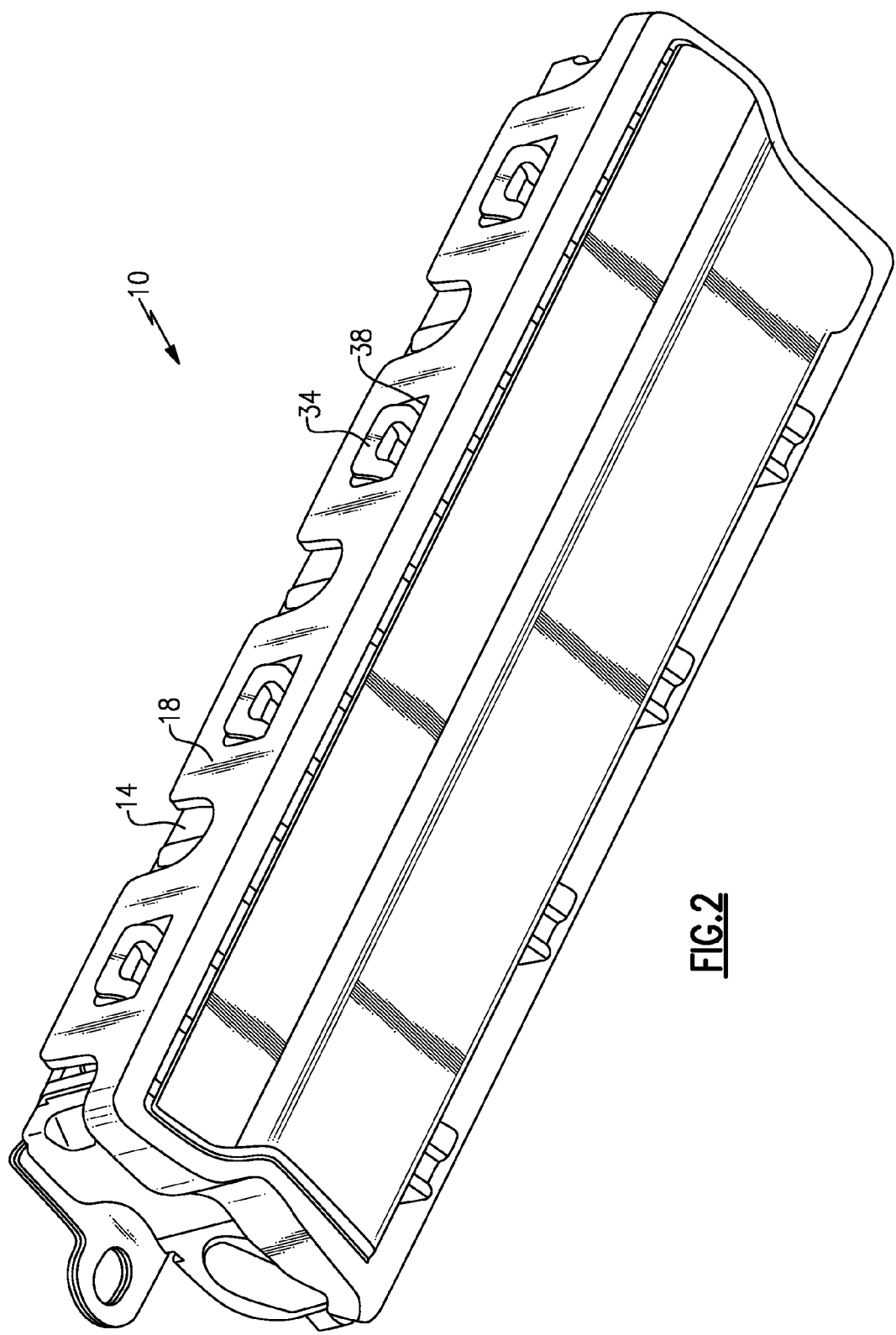
FIG. 2 shows another perspective view of the FIG. 1 assembly.
Figure 3:
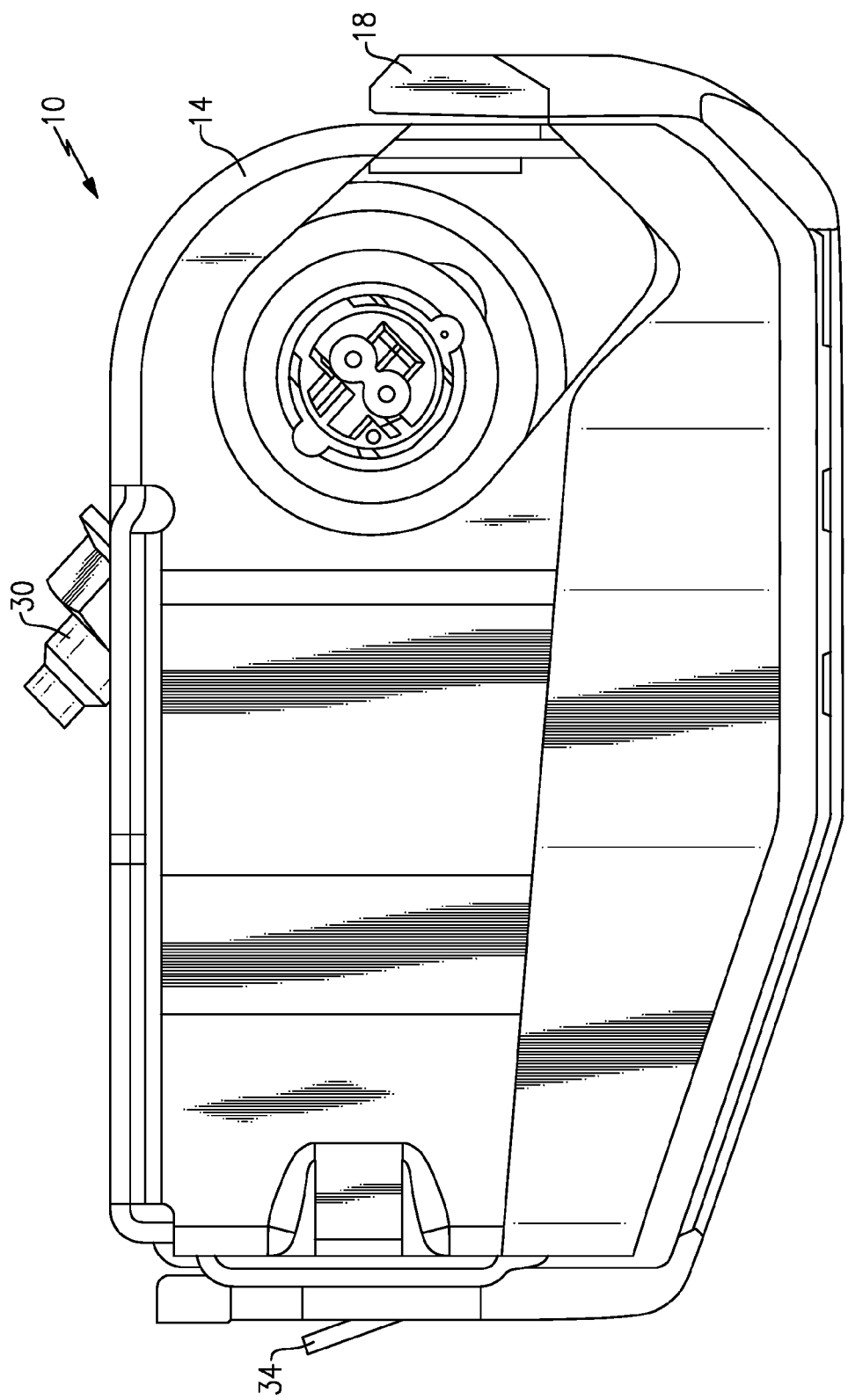
FIG. 3 shows an end view of the FIG. 1 assembly.
Figure 4:
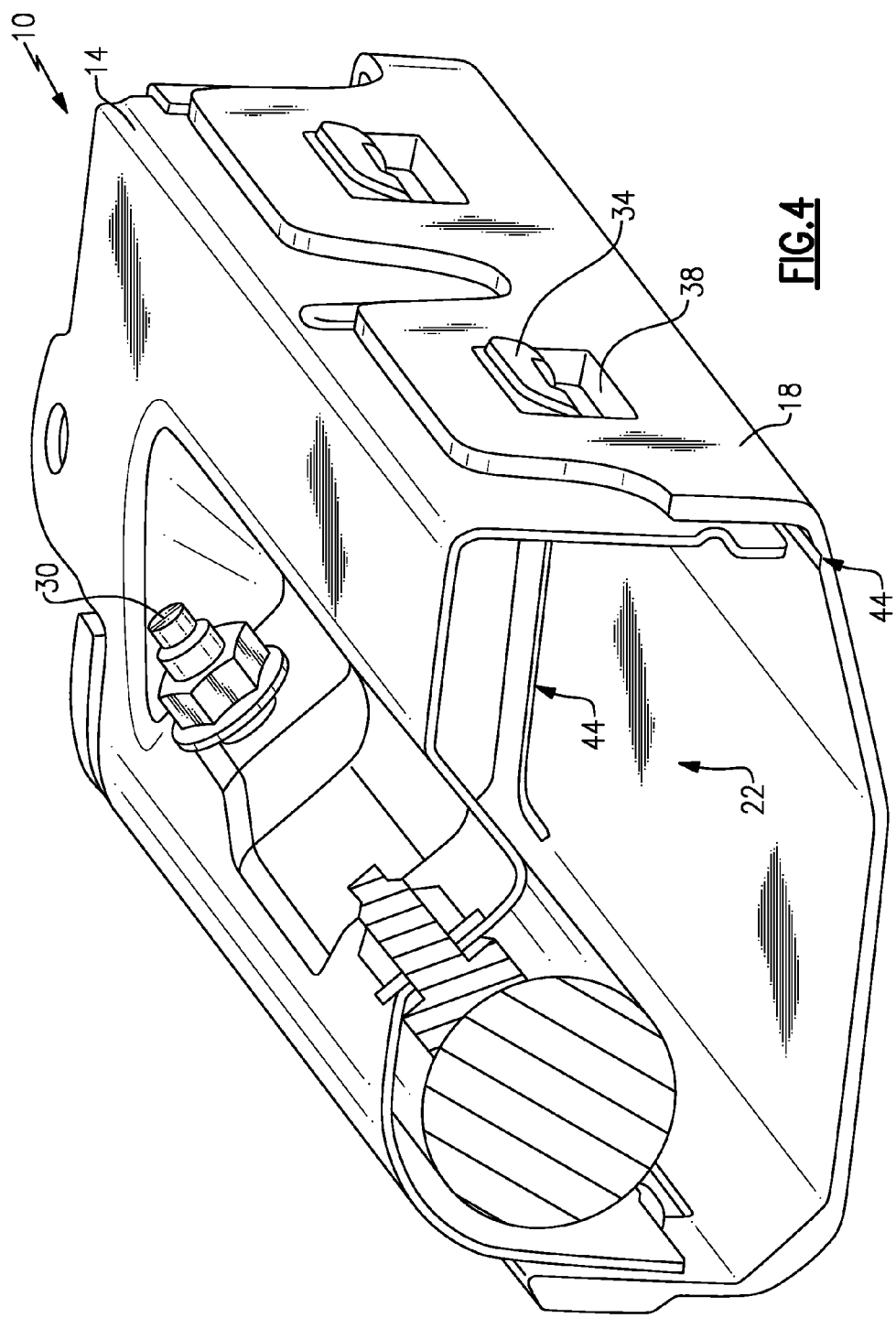
FIG. 4 shows a section view at line 4-4 of the FIG. 1 assembly.
Figure 5:
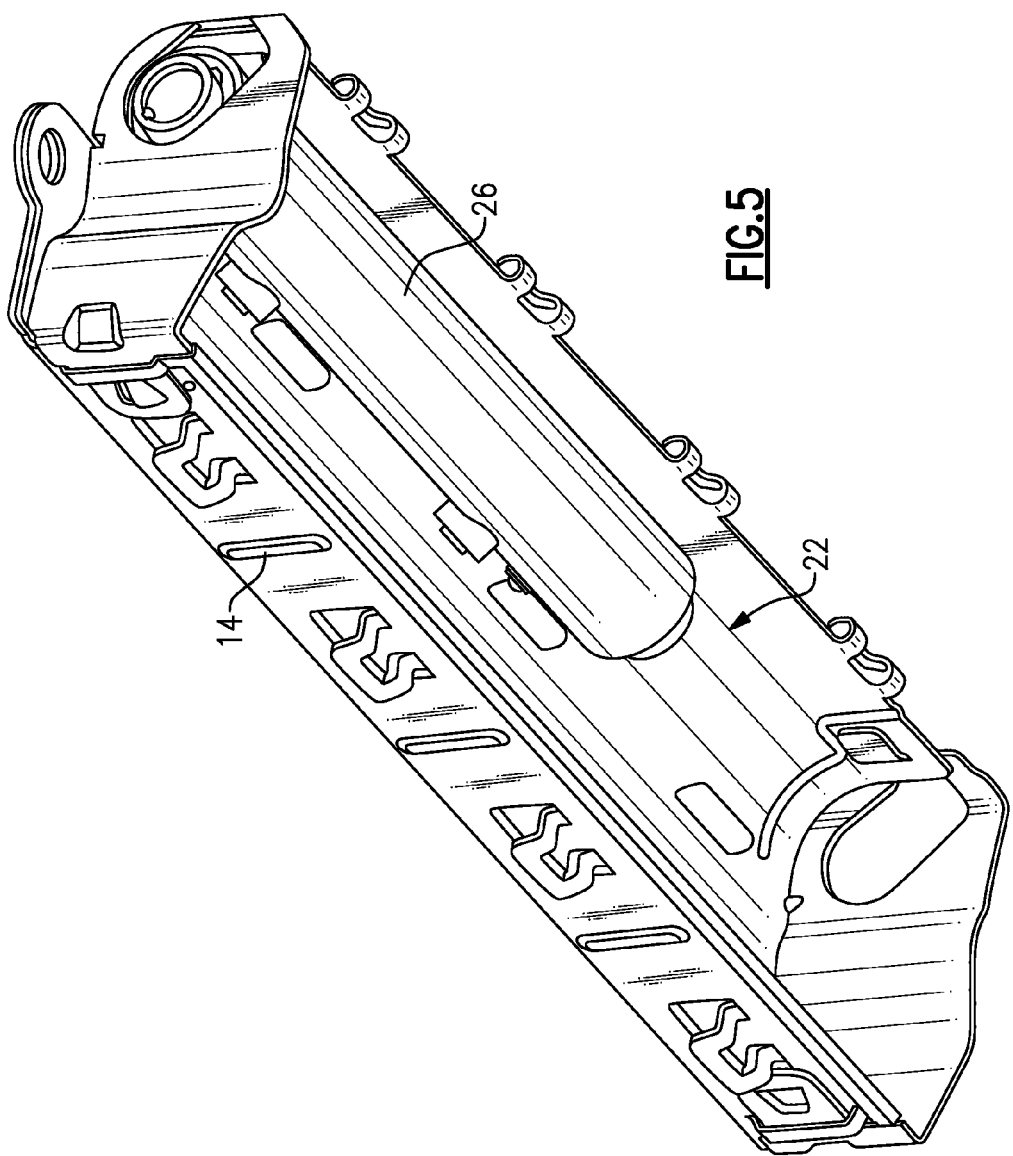
FIG. 5 shows a perspective view of the FIG. 1 assembly with lid removed.
Figure 6:
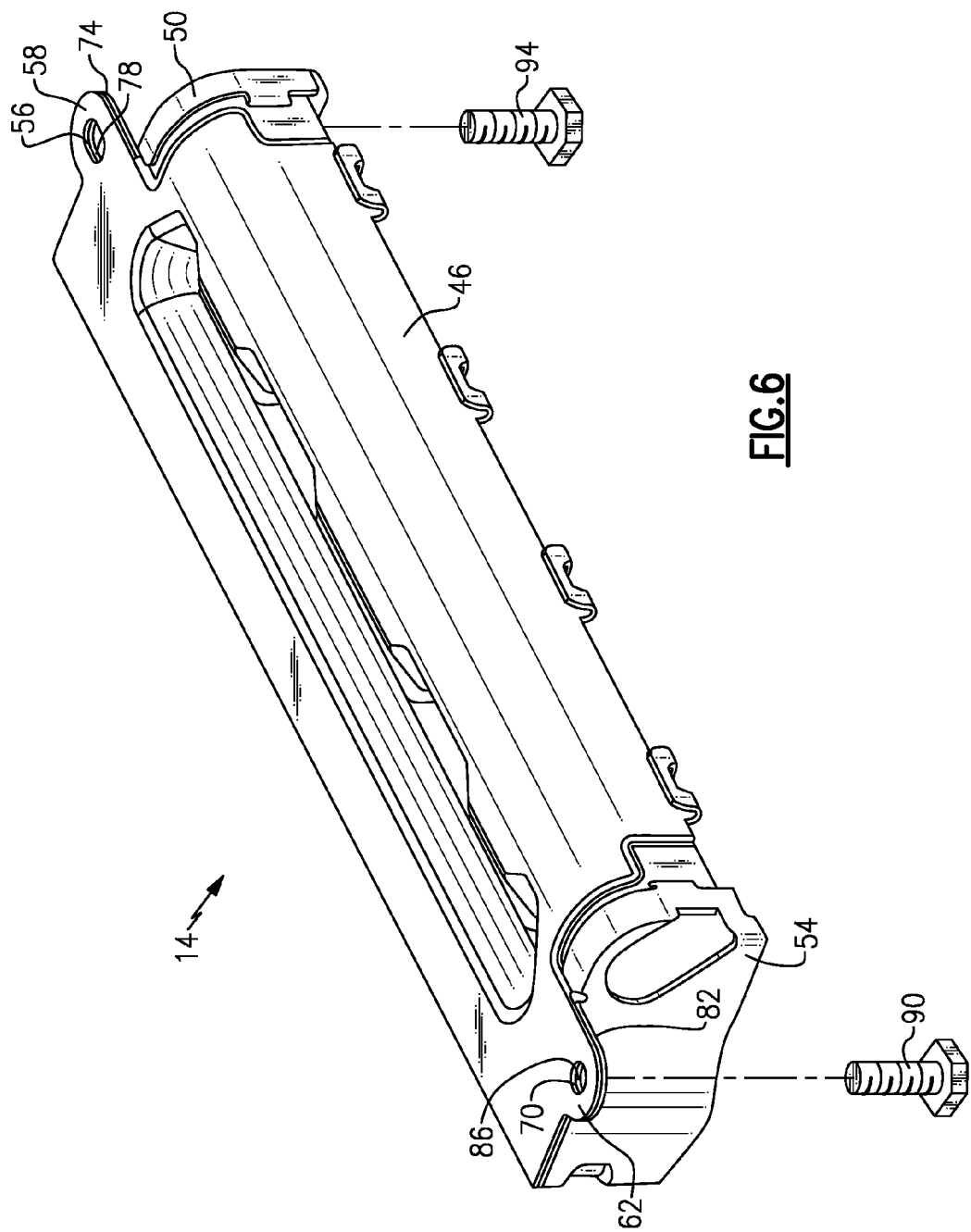
FIG. 6 shows a perspective view of a housing of the FIG. 1 assembly.
Figure 7:
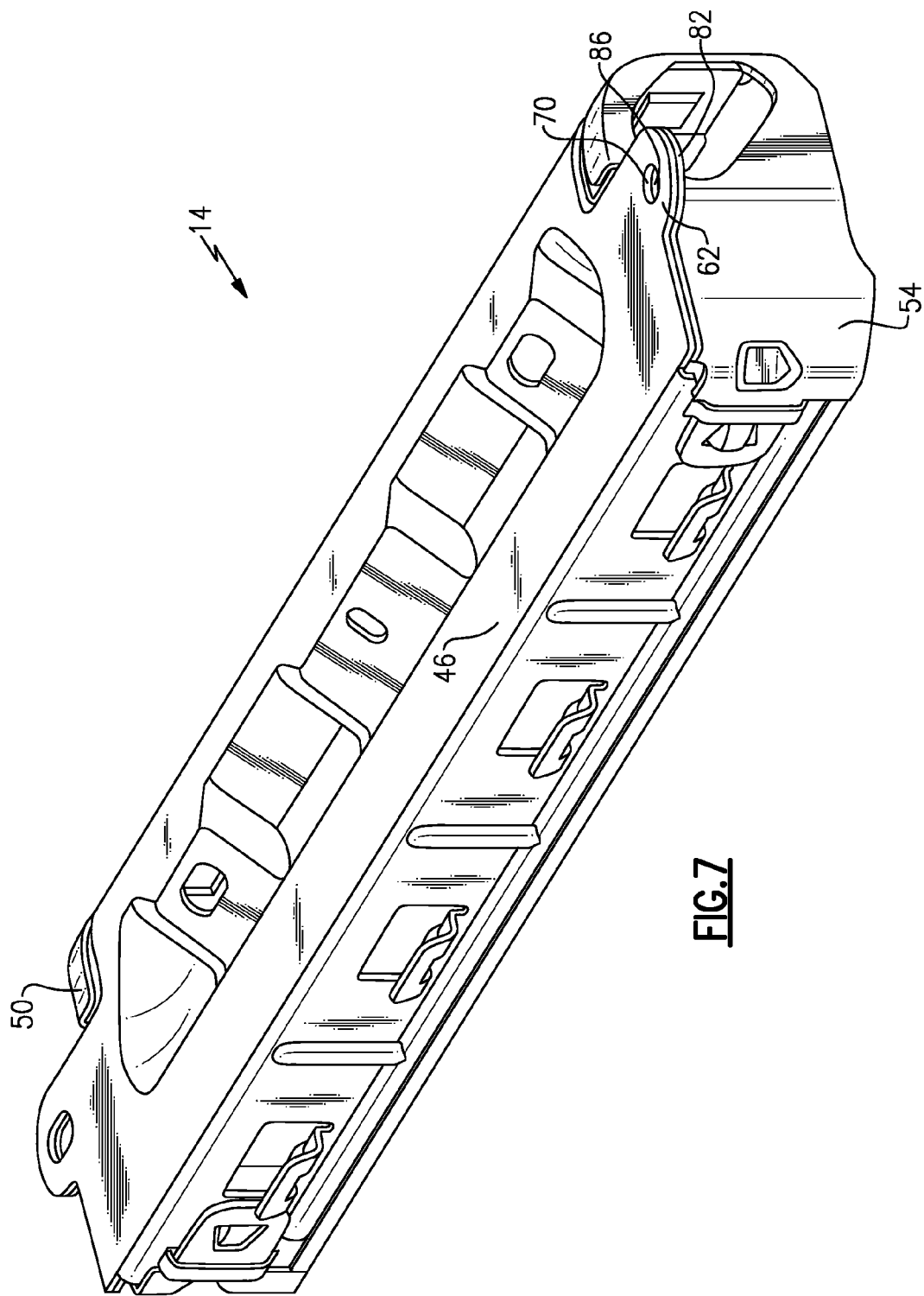
FIG. 7 shows another perspective view of the housing of the FIG. 1 assembly.
Figure 9:
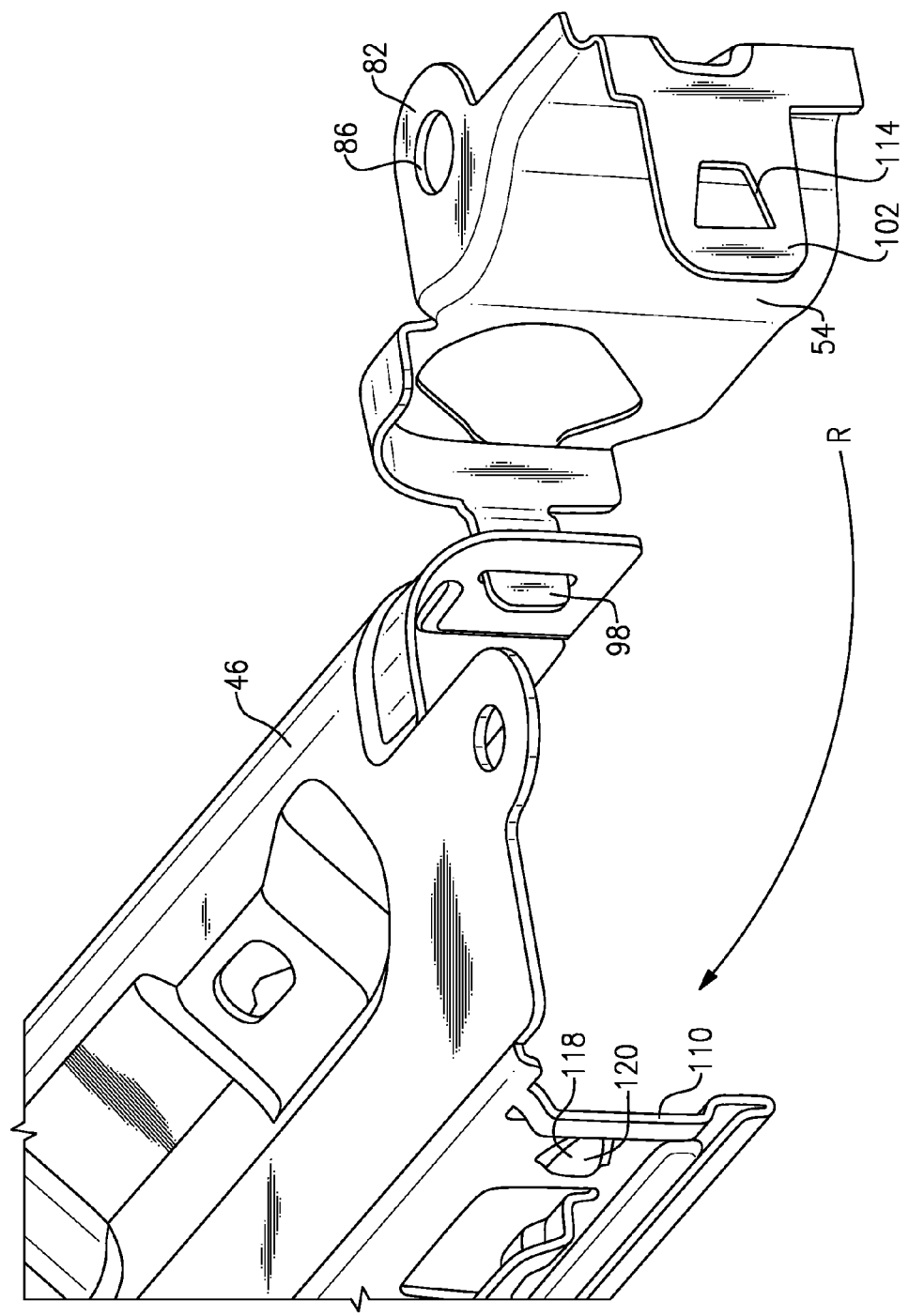
FIG. 9 shows the end of the housing in the FIG. 1 airbag housing assembly having an end cap in a partially assembled position.
Figure 10:
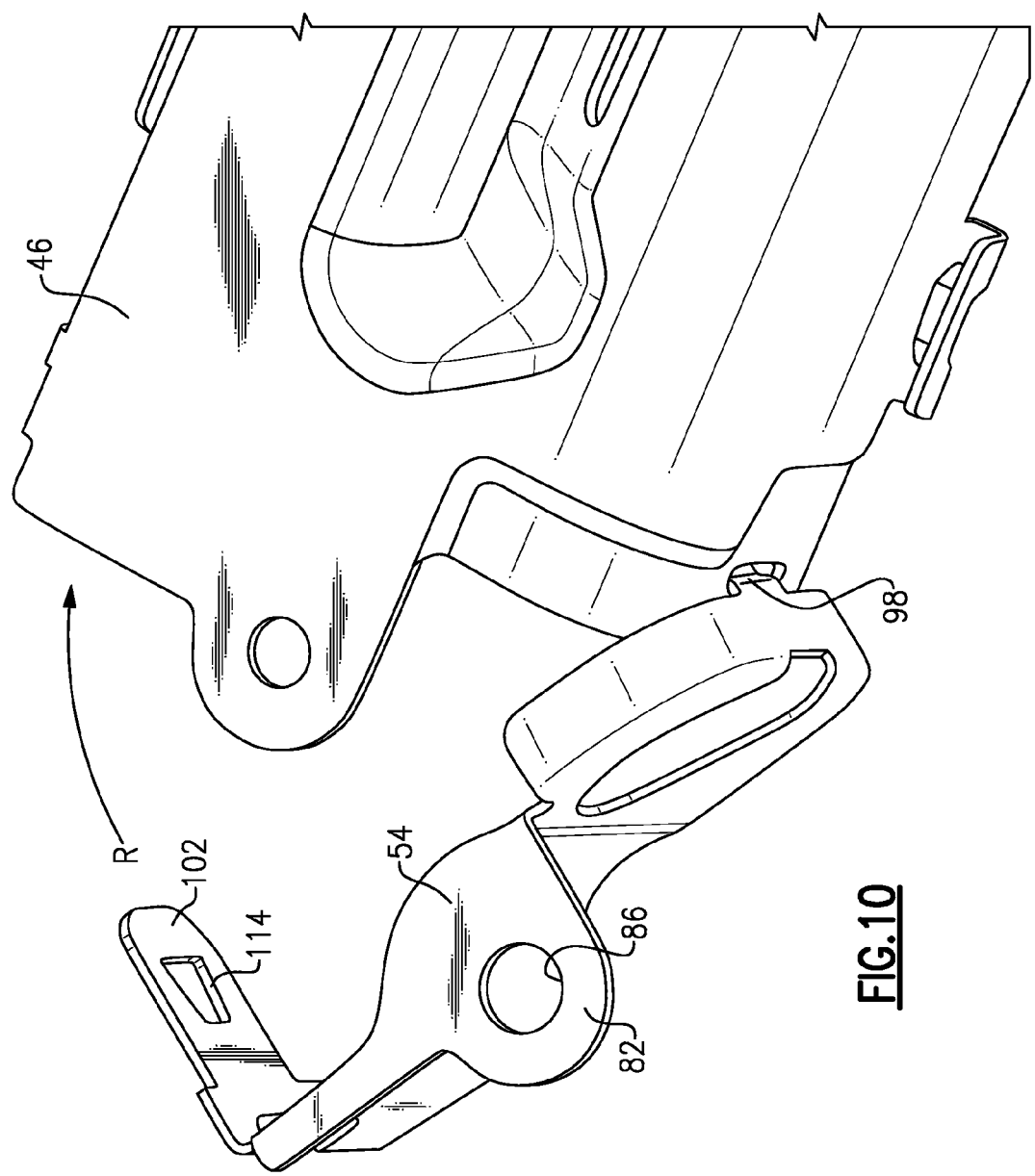
FIG. 10 shows another view of the end of the housing in the FIG. 1 airbag housing assembly having an end cap in the partially assembled position of FIG. 9.
Figure 11:
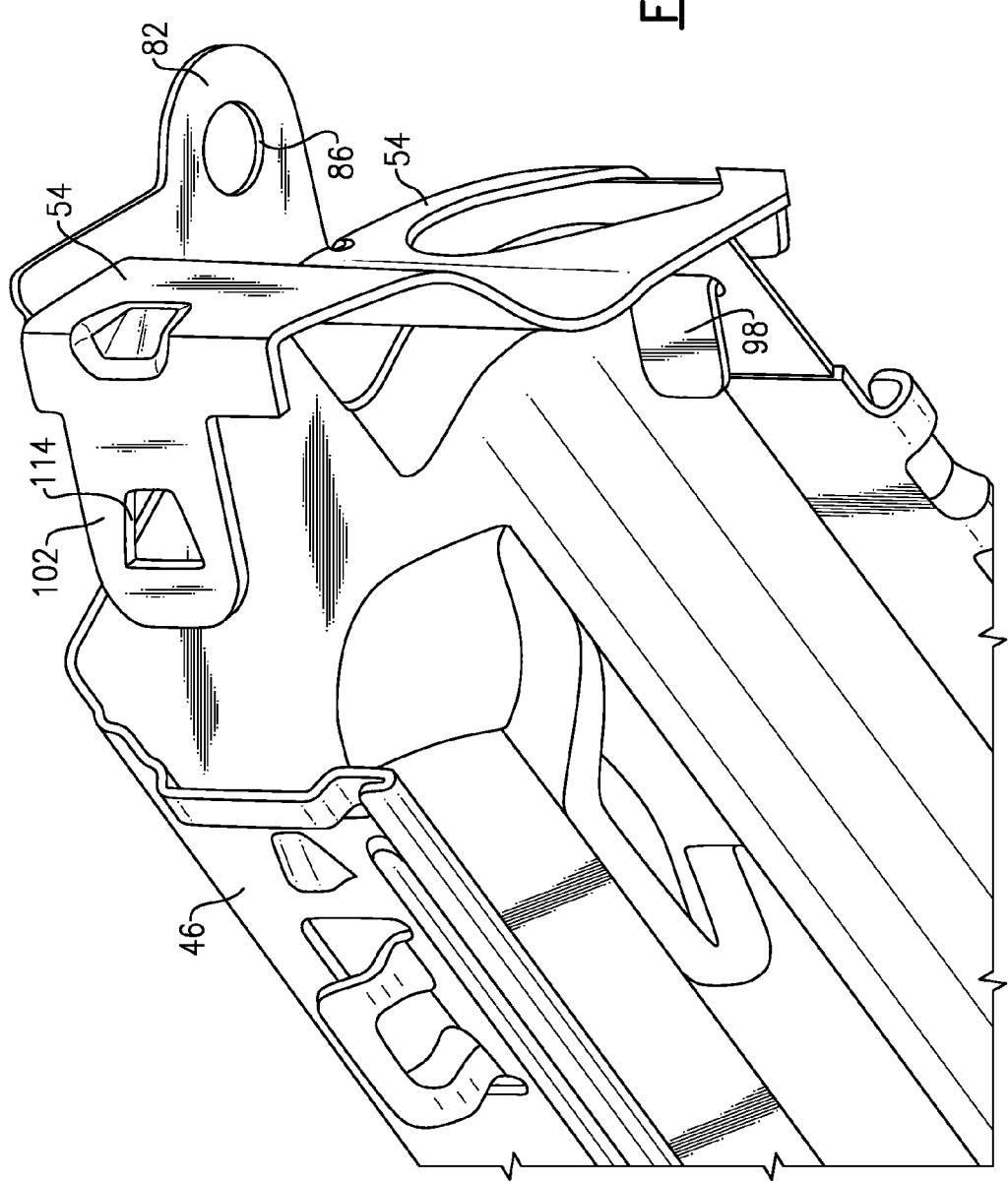
FIG. 11 shows another view of the end of the housing in the FIG. 1 airbag housing assembly having the end cap in a partially assembled position of FIG. 9.
Figure 12:
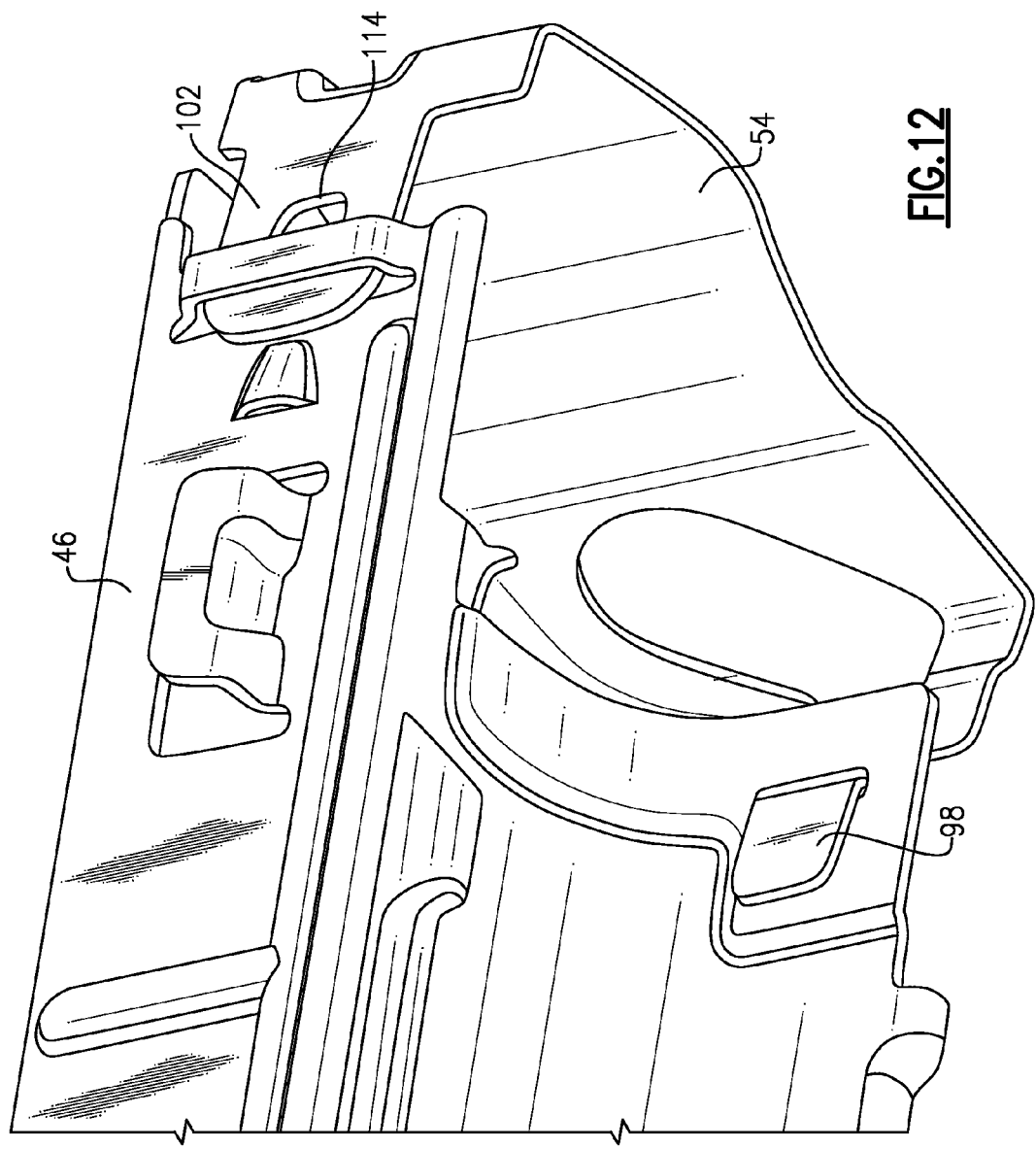
FIG. 12 shows another view of the end of the housing in the FIG. 1 airbag housing assembly having an end cap in another partially assembled position.

Referring to FIGS. 1-5, an example airbag housing assembly 10 includes a main body portion 14 and a lid 18. The main body portion 14 establishes an opening 22 that is configured to receive an airbag (not shown) and an airbag inflator 26. During assembly, the airbag, which is folded, is positioned within the opening 22 of the airbag housing assembly 10 in a known manner.

Threaded fasteners 30 are used to secure the airbag and the airbag inflator 26 to the main body portion 14. Tabs 34 extending from the main body portion 14 are received within apertures 38 of the lid 18 to hold the position of the lid 18 relative to the main body portion 14. The lid 18 covers the opening 22.

The example type of airbag housing assembly 10 is configured to house a knee airbag module. However, a person skilled in the art and having the benefit of this disclosure would understand other types of airbag housings that could benefit from the teachings of the disclosed examples.

In this example, a controller 42 is mounted to a vehicle in communication with the airbag inflator 26. The controller 42 is configured to send a signal to the airbag inflator 26, which then inflates the airbag in response to the signal. The airbag expands through the lid 18 during inflation. The lid 18 separates at seams 44 molded within the lid 18 to allow the airbag to expand through the lid 18. The seams 44 facilitate expansion of the airbag through the lid 18. A person having skill in this art and the benefit of this disclosure would understand how to initiate a deployment of the airbag using the controller 42.

The example airbag housing assembly 10 directs the airbag during deployment. The airbag housing assembly 10 also protects the undeployed airbag and the airbag inflator 26.

Referring now to FIGS. 6-15 with continuing references to FIGS. 1-5, the example main body portion 14 includes a base 46, a first end cap 50, and a second end cap 54. A first end of the base 46 includes a lateral extending tab 58. An opposing, second end of the base 46 includes another laterally extending tab 62. The laterally extending tab 58 establishes an aperture 56, and the laterally extending tab 62 establishes an aperture 70.

The first end cap 50 includes a laterally extending tab 74 that establishes an aperture 78. The second end cap 54 includes a laterally extending tab 82 that establishes an aperture 86. The aperture 70 is coaxial with the aperture 86.

When the main body portion 14 is secured to a vehicle, a threaded fastener 90 extends through the apertures 70 and 86 and is connected directly to the vehicle. The threaded fastener 90 thus secures both the first end cap 50 and the base 46 to the vehicle.

Similarly, when the main body portion 14 is secured to a vehicle, a threaded fastener 94 extends through the apertures 78 and 86. The threaded fastener 94 thus secures both the second end cap 54 and the base 46 to the vehicle.

In this example, the first end cap 50, the second end cap 54, and the base 46 are plastic. One or more of these components comprises a different material, such as metal, in another example.

Figure 13:
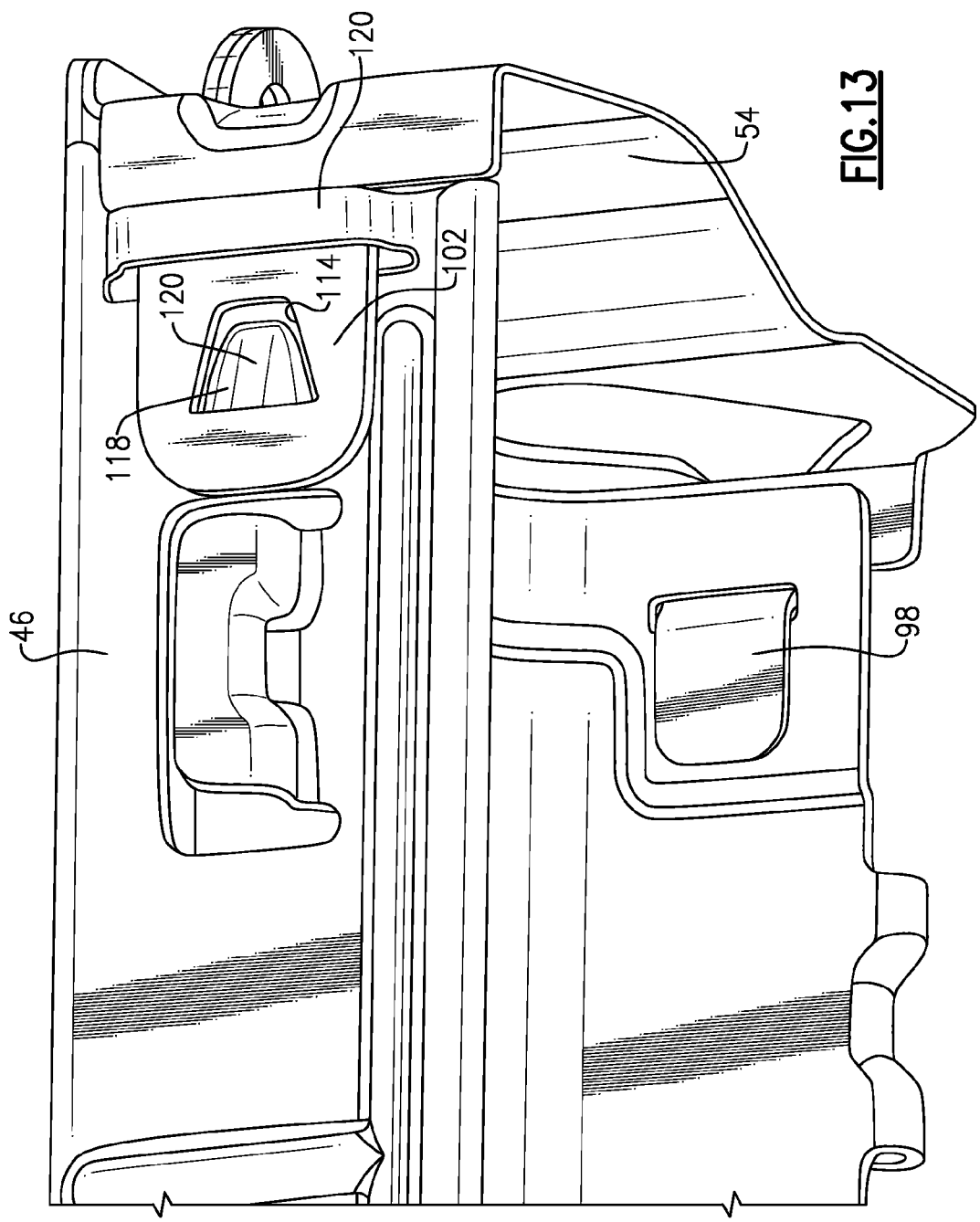
FIG. 13 shows another end view of the housing in the FIG. 1 airbag housing assembly.
Figure 14:
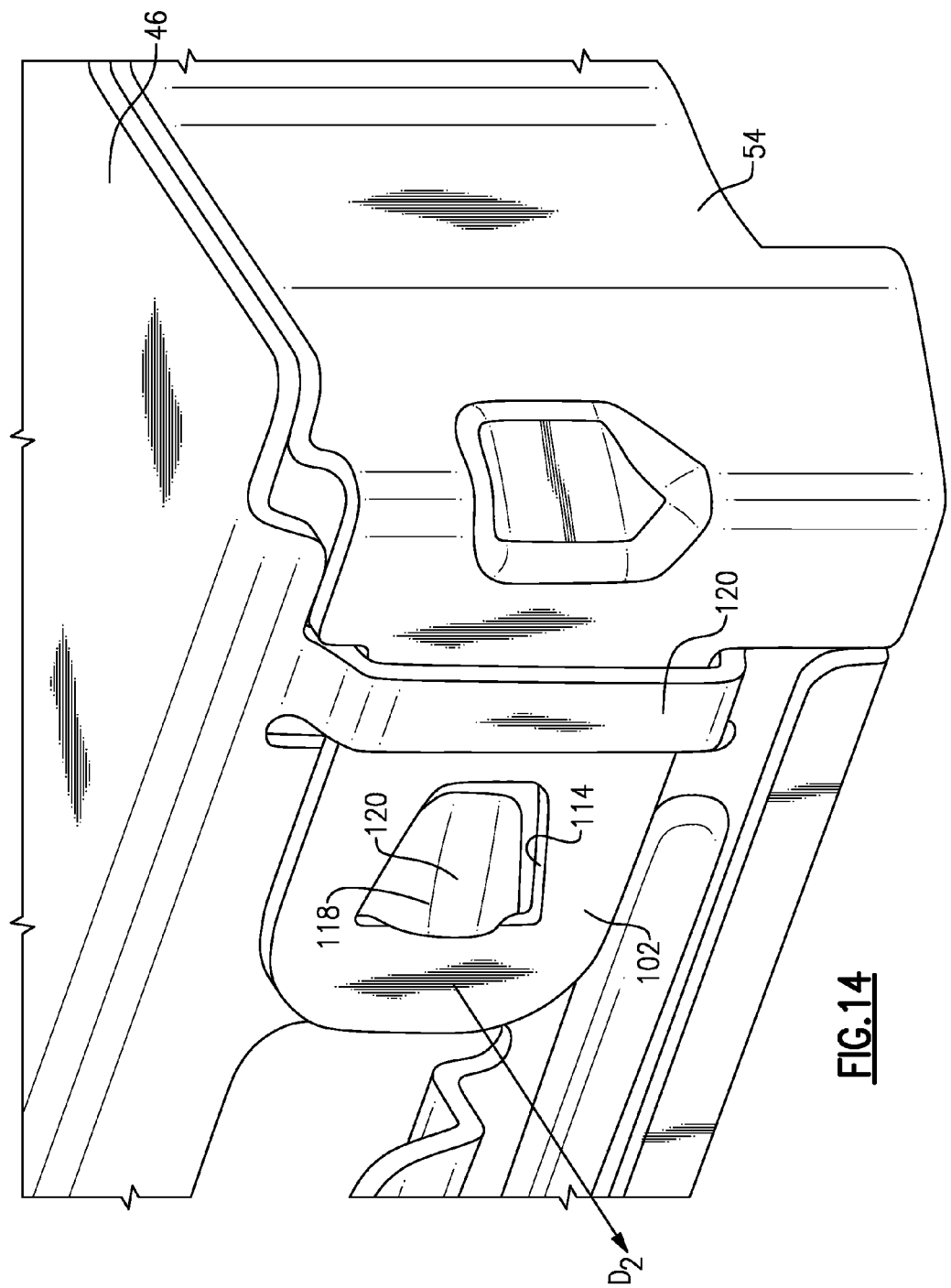
FIG. 14 shows a close-up end view of the housing in the FIG. 1 airbag housing assembly.
Figure 15:
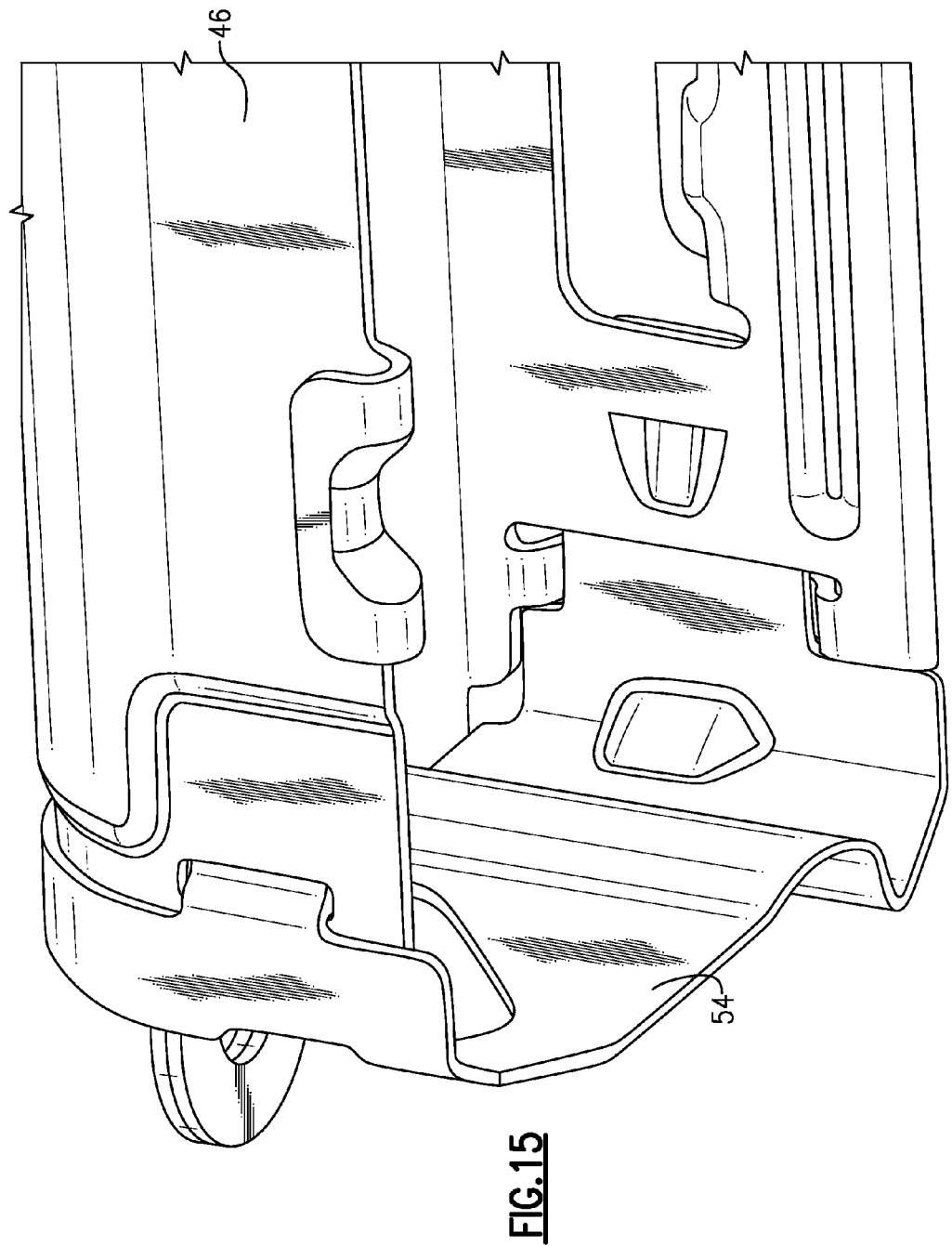
FIG. 15 shows yet another end view of the housing in the FIG. 1 airbag housing assembly.
Figure 16:
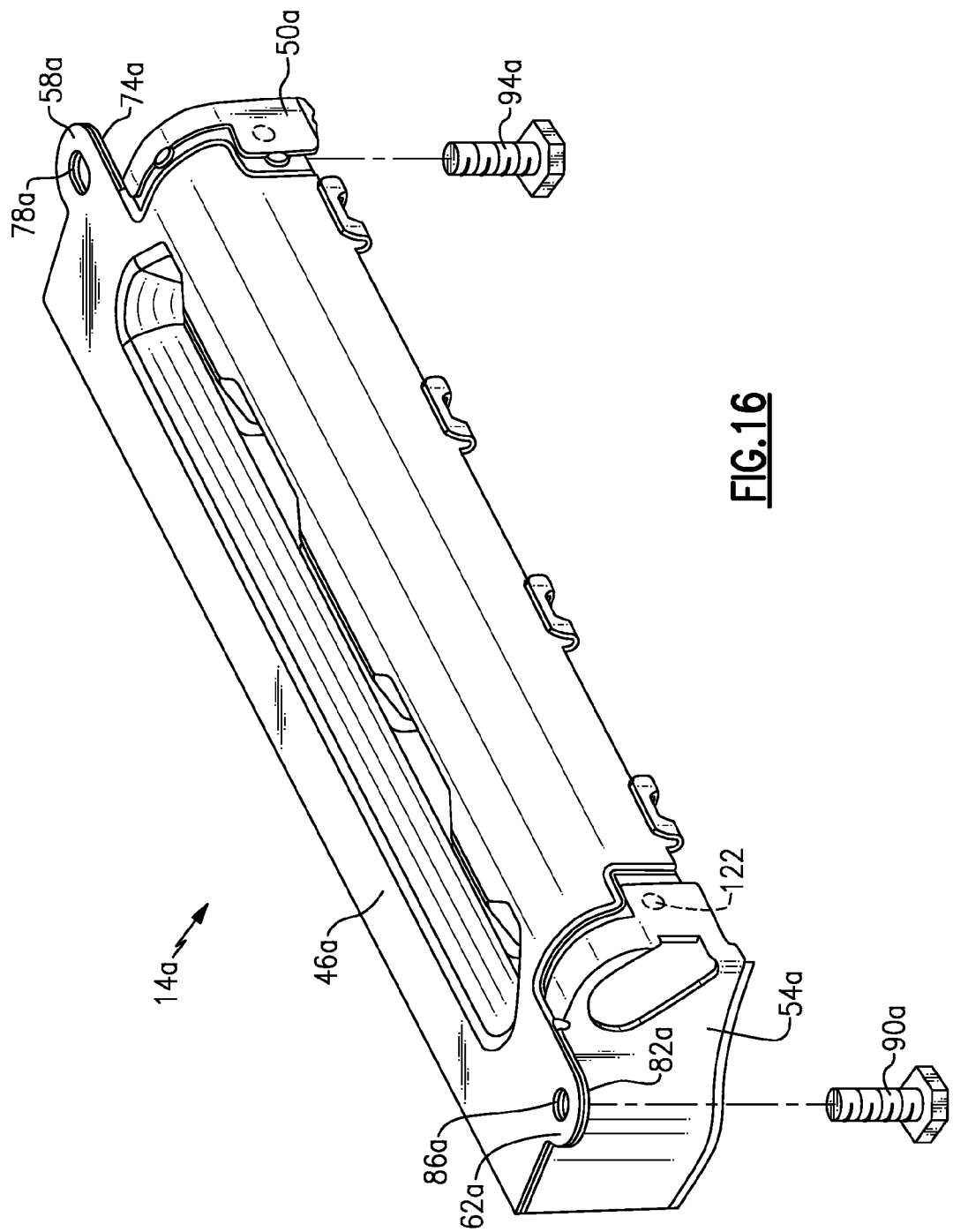
FIG. 16 shows another example housing for use in the FIG. 1 airbag housing assembly.
Figure 17:
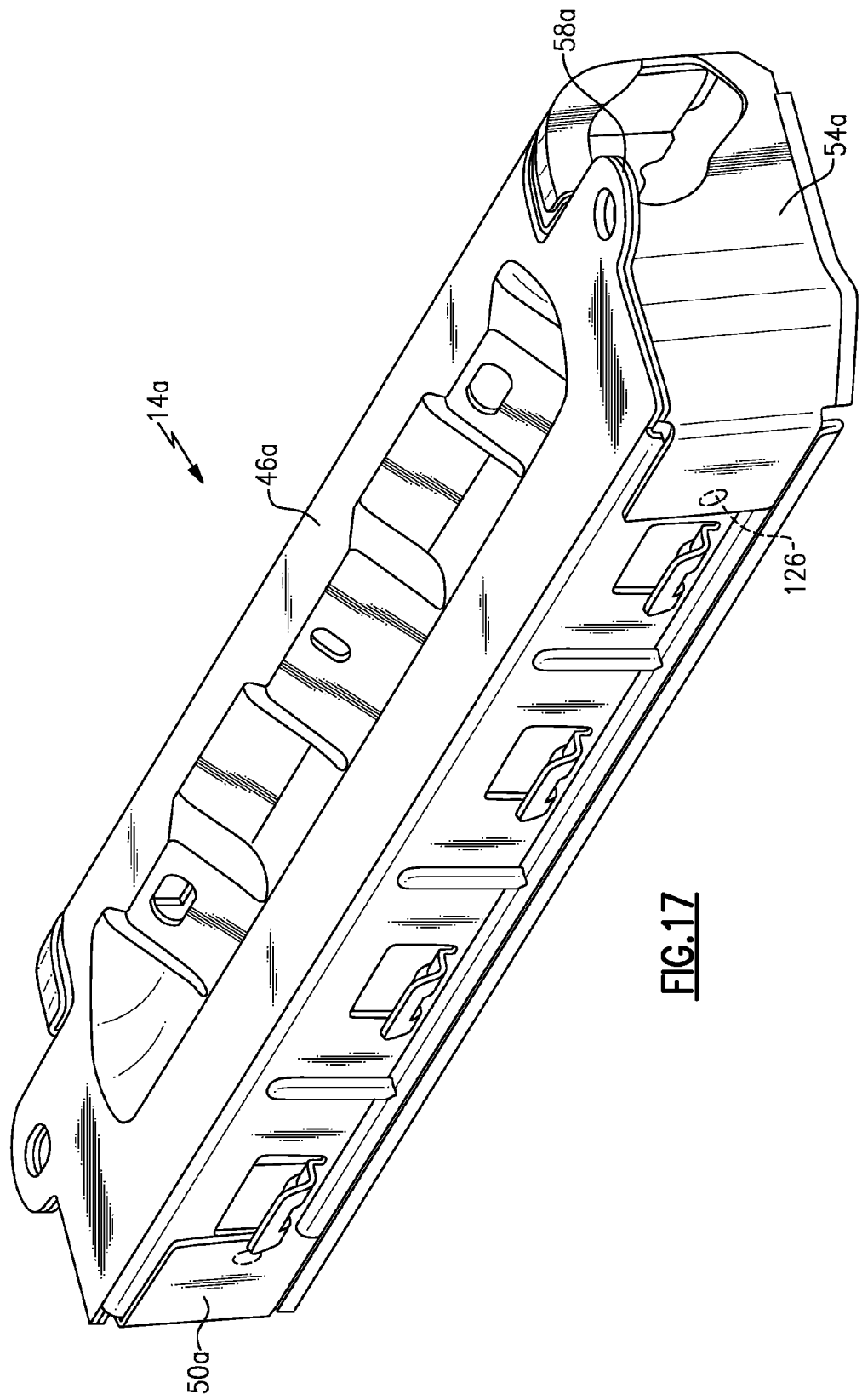
FIG. 17 shows another perspective view of the FIG. 16 housing.
Figure 18:
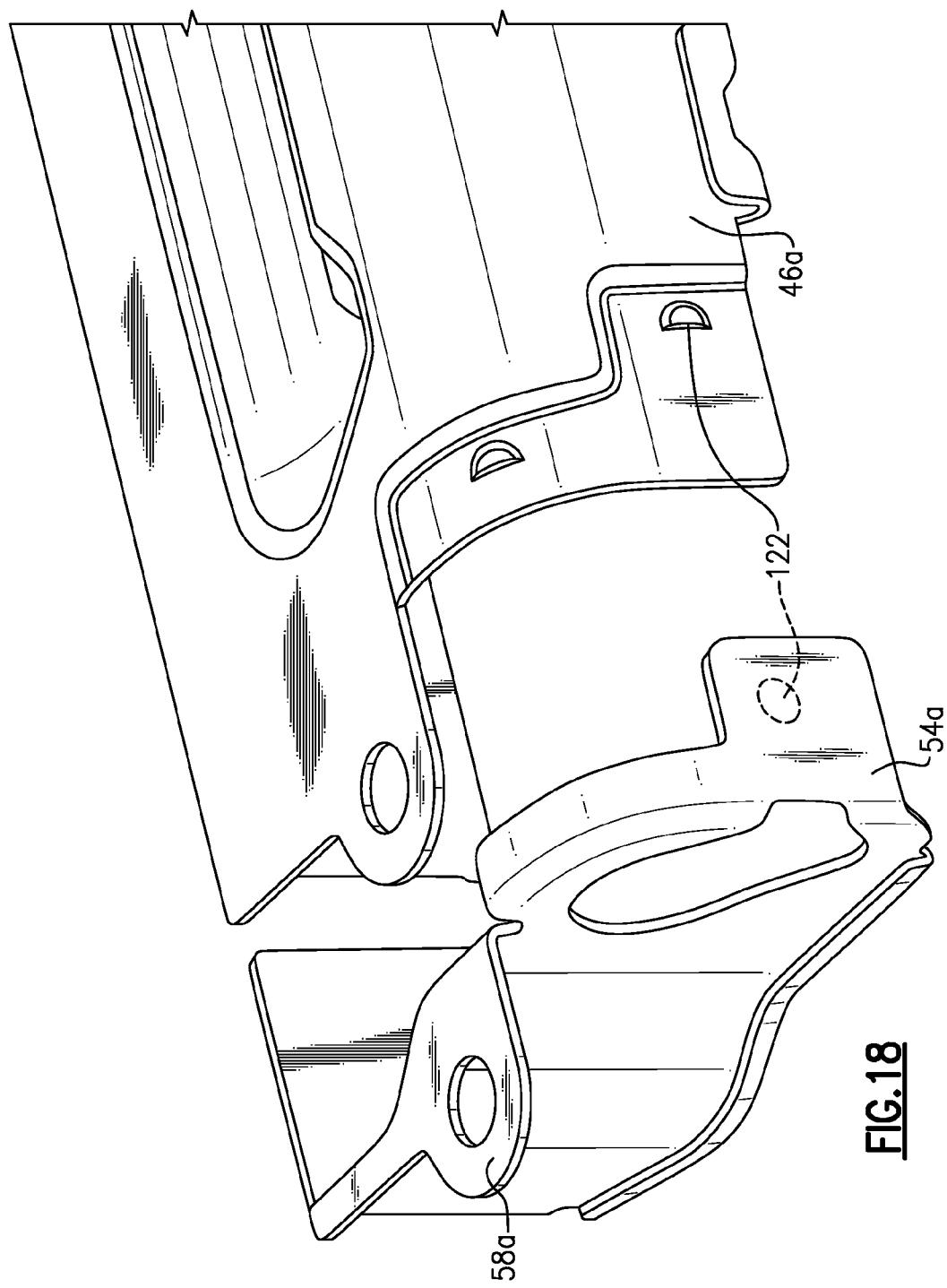
FIG. 18 shows an exploded view of an end of the FIG. 16 housing.
Figure 19:
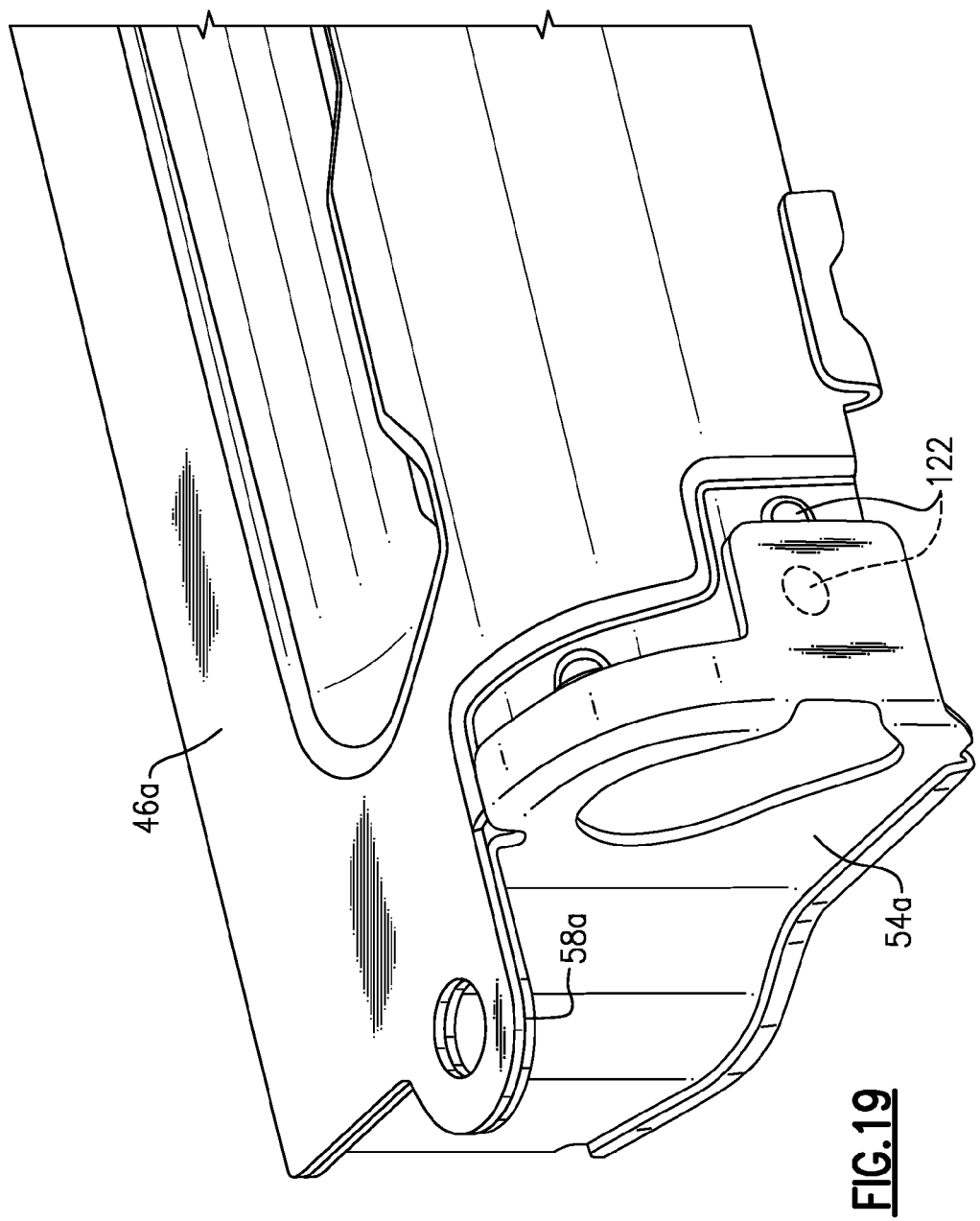
FIG. 19 shows another view of the end of the housing in the FIG. 16 airbag housing assembly having an end cap in a partially assembled position.

In this example, the second end cap 54 includes a mounting tab 98 and a locking tab 102. During assembly of the second end cap 54 to the base 46 of the main body portion 14, the mounting tab 98 is moved in a direction $D_1$ (FIG. 8) and is inserted within an aperture 106 established within the base 46. The second end cap 54 is then rotated about the mounting tab 98 along a path R (FIGS. 9 and 10) until the locking tab 102 is in an assembled position relative to the base 46 (FIG. 13). The second end cap 54 is thus "snap-fit" to the base 46.

The first end cap 50 includes a corresponding mounting tab and locking tab that function in a similar manner to secure the first end cap 50 relative to the base 46.

The locking tab 102 is received under a belt loop portion 110 established within the base 46 when the second end cap 54 is in an assembled position. An aperture 114 within the locking tab 102 also receives an extension 118 protruding from the base 46 when the second end cap 54 in the installed position. Notably, the extension 118 includes a tapered wall 120 that facilitates moving the locking tab 102 over the extension 118 during rotation until the extension 118 is received with in the aperture 114. The locking tab 102 snaps over the extension 118 when moving to the assembled position.

The belt loop portion 110 facilitates holding the second end cap 54 relative to the base 46 during expansion of the airbag from the main body portion 14. The housing flexes outward during expansion of the airbag. The belt loop portion 110 limits movement of the locking tab 102 in a direction $D_2$ (FIG. 14) to a position that would allow the extension 118 to move from the aperture 114.

Referring to FIGS. 16-20, another example airbag main body portion 14a includes a first end cap 50a and a second end cap 54a that are each welded to a base 46a. In this example, a spot weld 122 and a spot weld 126 are utilized to secure the second end cap 54a to the base 46a of the airbag main body portion 14a.

The example airbag main body portion 14a is metal, although various other materials could be used.

In this example, the second end cap 54a includes a tab 82a, and the end cap 50a includes a tab 74a. The base 46a of the airbag main body portion 14a establishes a laterally extending tab 62a that establishes an aperture 86a, and laterally extending tab 58a that establishes an aperture 78a. The tabs 82a and 62a are secured by a threaded fastener 90a to the vehicle when the main body portion 14a is in an installed position. The tabs 24a and 58a are secured to the vehicle with another threaded fastener 94a when the main body portion 14a is in an installed position. Thus, the end cap 50a and the second end cap 54a are secured to the vehicle through the associated threaded fastener 90a or 94a in addition to being welded to the base 46a.

Features of the disclosed embodiments include securing the end caps of an airbag housing assembly to the vehicle using a fastener rather than relying solely on the connection of the end cap to other portions of the airbag housing to secure the end caps. Another feature includes an end cap that snaps together with a base portion of an airbag housing. The snap together features include a belt loop type structure to accommodate flex of the end cap during expansion of the airbag.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An airbag housing assembly, comprising:
a base of an airbag housing assembly;
an end cap of the airbag housing assembly, the end cap positioned at a lateral end of the base and configured to be fastened directly to a vehicle; and
a base tab extending from the base and establishing a first aperture, and an end cap tab extending laterally from the end cap and establishing a second aperture, wherein the first aperture and the second aperture are configured to receive a fastener that secures the base and the end cap directly to the vehicle.

2. The airbag housing assembly of claim 1, wherein the airbag housing assembly is configured to hold a knee airbag and an airbag inflator.

3. The airbag housing assembly of claim 1, including a fastener that extends through an aperture established in the base and another aperture established within the end cap to fasten the base and the end cap to the vehicle.

4. The airbag housing assembly of claim 1, wherein the end cap is snap-fit to the base.

5. The airbag housing assembly of claim 1, wherein the base and the end cap are welded together.

6. The airbag housing assembly of claim 1, including a locking tab established in the base or the end cap, and an extension protruding from the other of the base or the end cap, wherein the locking tab includes an aperture that receives the extension to limit relative movement between the base and the end cap.

7. The airbag housing assembly of claim 6, including a belt loop portion configured to hold the position the locking tab relative to the extension.

8. The airbag housing assembly of claim 6, including a mounting tab established in the base or the end cap, and an aperture in the other of the base or the end cap, wherein the aperture is configured to receive the mounting tab to limit relative movement between the base and the end cap.

9. The airbag housing assembly of claim 8, wherein the mounting tab and the locking tab are both established in the end cap, and the end cap is configured to rotate about the locking tab as the locking tab engages the extension.

10. The airbag housing assembly of claim 1, including another end cap securable adjacent an opposing lateral end of the base, wherein the base and both end caps are configured to be fastened directly to a vehicle.

11. An airbag housing assembly, comprising:
a base; and
an end cap securable to an end of the base, wherein the base and the end cap each include a portion that is configured to be directly held together relative to a vehicle by a fastener to secure the base and the end cap relative to the vehicle.

12. The airbag housing assembly of claim 11, wherein the base and the end cap each establish an aperture that is configured to receive a threaded fastener.

13. A method for assembling an airbag housing, comprising:
   securing an end cap to a base;
   fastening the end cap and the base to a vehicle;
   capturing a portion of the end cap between a fastener and a portion of the vehicle during the fastening; and
   capturing a portion of the base between the fastener and a portion of the vehicle during the fastening.

14. The method of claim 13, including receiving an extension within an aperture established in a locking tab during the securing.

15. The method of claim 14, including limiting movement of the locking tab using a belt loop.

16. The method of claim 13, including inserting a mounting tab into an aperture, and then rotating the end cap about a mounting tab during the securing.

17. The method of claim 13, including welding the end cap to the base during the securing.

18. The method of claim 13, separating a lid at the seams to allow an airbag held by the airbag housing to expand through the lid.

* * * * *